US012664614B2

(12) United States Patent
Azevedo et al.

(10) Patent No.: US 12,664,614 B2
(45) Date of Patent: Jun. 23, 2026

(54) RAPID IMAGE STITCHING WITH PREVIEW CAPABILITIES

(71) Applicant: Translucence Biosystems, Inc., Irvine, CA (US)

(72) Inventors: Ricardo R Azevedo, Irvine, CA (US); Jack Zeitoun, Irvine, CA (US); Anthony Reksoatmodjo, Irvine, CA (US)

(73) Assignee: TRANSLUCENCE BIOSYSTEMS, INC., Irvine, CA (US)

( * ) Notice: Subject to any disclaimer, the term of this patent is extended or adjusted under 35 U.S.C. 154(b) by 731 days.

(21) Appl. No.: 18/048,695

(22) Filed: Oct. 21, 2022

(65) Prior Publication Data

US 2023/0128420 A1    Apr. 27, 2023

Related U.S. Application Data

(60) Provisional application No. 63/270,255, filed on Oct. 21, 2021.

(51) Int. Cl.
*G06T 5/50* (2006.01)
*G06T 1/20* (2006.01)
*G06T 3/4038* (2024.01)

(52) U.S. Cl.
CPC .................. *G06T 5/50* (2013.01); *G06T 1/20* (2013.01); *G06T 3/4038* (2013.01); *G06T 2207/20221* (2013.01)

(58) Field of Classification Search
CPC ........... G06T 5/50; G06T 1/20; G06T 3/4038; G06T 2207/20221; G06T 2207/10016; G06T 7/33
See application file for complete search history.

(56) References Cited

U.S. PATENT DOCUMENTS

| | | | | |
|---|---|---|---|---|
| 6,469,710 | B1 * | 10/2002 | Shum ...................... | G06T 15/04 |
| | | | | 382/284 |
| 10,949,948 | B1 * | 3/2021 | Kuzmin .................... | G06T 1/60 |
| 2008/0060034 | A1 * | 3/2008 | Egnal ..................... | G03B 37/04 |
| | | | | 348/340 |
| 2012/0328178 | A1 * | 12/2012 | Remiszewski .......... | G06T 11/60 |
| | | | | 382/133 |
| 2013/0034312 | A1 * | 2/2013 | Sudheendra ........... | G06V 10/26 |
| | | | | 382/284 |

(Continued)

*Primary Examiner* — Solomon G Bezuayehu

(74) *Attorney, Agent, or Firm* — NGUYEN TARBET IP LAW

(57)    ABSTRACT

Multiple digital image tiles are stitched together into a single digital image through use of reactive alpha mask generation, allowing for efficient tile rearrangement and preview capabilities. The present invention features a method for stitching a first image tile and a second image tile to display a preview of a stitched image through use of alpha masking. The method may comprise arranging the first image tile and the second image tile into an initial image display, aligning the first image tile and the second image tile of the initial image display such that shared pixel regions of the first image tile overlap those of the second image tile, stitching the aligned first image tile to the aligned second image tile, applying the alpha blending mask of the stitched image to the initial image display, and displaying the initial image display with the alpha blending mask applied.

16 Claims, 4 Drawing Sheets

(56) References Cited

U.S. PATENT DOCUMENTS

| | | | |
|---|---|---|---|
| 2013/0054086 A1* | 2/2013 | Lo | B60R 1/27 |
| | | | 701/36 |
| 2014/0320599 A1* | 10/2014 | Blonde | H04N 13/106 |
| | | | 348/43 |
| 2016/0142644 A1* | 5/2016 | Lin | G06V 10/757 |
| | | | 348/143 |
| 2018/0197331 A1* | 7/2018 | Chen | G06T 19/20 |
| 2019/0370949 A1* | 12/2019 | Hutchinson | G06T 3/4038 |
| 2020/0167995 A1* | 5/2020 | Hare | G06T 7/194 |
| 2022/0043251 A1* | 2/2022 | Moore | G06T 5/50 |
| 2023/0025778 A1* | 1/2023 | Shoa Hassani Lashdan | H04N 19/139 |
| 2023/0097584 A1* | 3/2023 | Chakravarty | G06N 3/08 |
| | | | 382/276 |
| 2023/0267625 A1* | 8/2023 | Tentori | G06V 10/25 |

* cited by examiner

FIG. 3
Prior Art

RAPID IMAGE STITCHING WITH PREVIEW CAPABILITIES

CROSS-REFERENCES TO RELATED APPLICATIONS

This application is a non-provisional and claims benefit of U.S. Provisional Application No. 63/270,255 filed Oct. 21, 2021, the specification of which is incorporated herein in its entirety by reference.

FIELD OF THE INVENTION

The present invention is directed to systems and methods for stitching multiple microscope digital image tiles together into a single digital image through the use of reactive alpha mask generation allowing for efficient image stitching and preview capabilities.

BACKGROUND OF THE INVENTION

Stitching is a necessary procedure in many multidimensional image mosaic processing workflows. Stitching allows for the combination of a plurality of digital images with overlapping pixel regions or fields of view into a single digital image such that the overlapping pixel regions or fields of view are blended. This can be used for the generation of a segmented panorama or a high-resolution image from multiple photographs taken of the same location. An example of this can be seen in FIG. 2.

Image stitching is generally carried out by arranging the multiple image "tiles" into a desired arrangement and executing a stitching algorithm. Tiles may have at least 2 dimensions. Prior image stitching algorithms comprise aligning the images based on the identification of congruent pixel regions within overlapping regions of adjacent tiles and blending the images based on the overlapping regions while accounting for parallax, lens distortion, scene motion, and exposure differences.

In prior systems, this final combined microscope image is written to the disk of the computer and must be loaded back from the disk to view it or edit it further. This is because the size of such images often ranges from tens to hundreds of gigabytes, exceeding the memory capacity of most systems. An example of these prior processes can be seen in FIG. 3. These methods lack time efficiency and are generally inefficient in cases in which the user wishes to rearrange the image tiles into a new configuration. To view a stitched image corresponding to the configuration, the stitched image must be saved to the disk first, and thus rearrangement requires separately reading the stitched image from the disk to an image viewer, and in parallel rearranging the new stitched image to be saved again. Thus, there exists a present need for an image stitching process that allows a user to arrange and rearrange image tiles and preview the stitched image before saving it.

BRIEF SUMMARY OF THE INVENTION

It is an objective of the present invention to provide systems and methods that allow for stitching multiple digital image tiles together into a single digital image through the use of reactive alpha mask generation allowing for efficient tile rearrangement and preview capabilities, as specified in the independent claims. Embodiments of the invention are given in the dependent claims. Embodiments of the present invention can be freely combined with each other if they are not mutually exclusive.

The present invention features a method for stitching only the viewed portion of a first image tile and a second image tile to display a preview of a stitched image through the use of alpha masking. The method may comprise arranging the first image tile and the second image tile into a desired stitching configuration such that one or more pixel regions of the first image tile correspond to one or more pixel regions of the second image tile. This desired stitching configuration may comprise an initial image display. The method may further comprise aligning the first image tile and the second image tile of the initial image display such that the one or more pixel regions of the first image tile overlap the corresponding one or more pixel regions of the second image tile. The method may further comprise stitching the aligned first image tile to the aligned second image tile through an image stitching algorithm, resulting in the stitched image. The method may further comprise calculating an alpha blending mask of the stitched image. The method may further comprise applying the alpha blending mask of the stitched image to the initial image display and displaying the initial image display with the alpha blending mask applied, resulting in the preview of the stitched image. In images with many tiles, the method may further be reactive by monitoring user input and updating only a subset of the stitched image that would be affected by user input. In some embodiments, the method may further comprise toggling the alpha blending mask off, such that the initial, unstitched image display is displayed, and toggling the alpha blending mask on, such that the preview of the stitched image is displayed. Toggling on the alpha blending mask may comprise the aforementioned "preview capabilities."

The present invention features a system for stitching a first image tile and a second image tile to display a preview of a stitched image through the use of alpha masking. In some embodiments, the system may comprise a computing device. The computing device may comprise a display component. The computing device may further comprise a central processing unit (CPU) and a graphic processing unit (GPU). The computing device may further comprise a memory component comprising computer-readable instructions for the CPU arranging the first image tile and the second image tile, aligning the first image tile and the second image tile of the initial image display into a desired stitching configuration, calculating an alpha blending mask of the aligned image tiles, and transmitting the aligned image tiles and the alpha blending mask to the GPU.

The memory component may further comprise computer-readable instructions for the GPU accepting the aligned image tiles and the alpha blending mask from the CPU and stitching the aligned first image tile to the aligned second image tile through an image stitching algorithm and the alpha blending mask, resulting in the stitched image. The memory component may further comprise computer-readable instructions for displaying, by the display component, the initial image display with the alpha blending mask applied, resulting in the preview of the stitched image.

One of the unique and inventive technical features of the present invention is the reactive generation of an alpha blending mask of a stitched image capable of being toggled on and off. Without wishing to limit the invention to any theory or mechanism, it is believed that the technical feature of the present invention advantageously provides for an image stitching program with preview capabilities, allowing the user to view the resulting stitched image of a given tile arrangement quickly and without needing to save and load a stitched image to the disk. None of the presently known prior references or work has the unique inventive technical feature of the present invention.

Moreover, the prior references teach away from the present invention. For example, microscopy image data is often larger than system memory capacity (tens to hundreds of gigabytes), thus common wisdom in the art states that the data must be written to disk in between updates. By only stitching what is being displayed and caching changes, the present invention circumvents this issue.

Furthermore, the inventive technical feature of the present invention contributed to a surprising result. One skilled in the art would expect that only stitching a portion of image data would result in a loss of accuracy and would not allow for the system to fully display the entire stitched image accurately since not all data is being accounted for. Surprisingly, stitching only overlapping data allows for mistakes in stitching to be caught earlier, resulting in a more accurate system overall. Thus, the inventive technical feature of the present invention contributed to a surprising result.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

Figure 3:
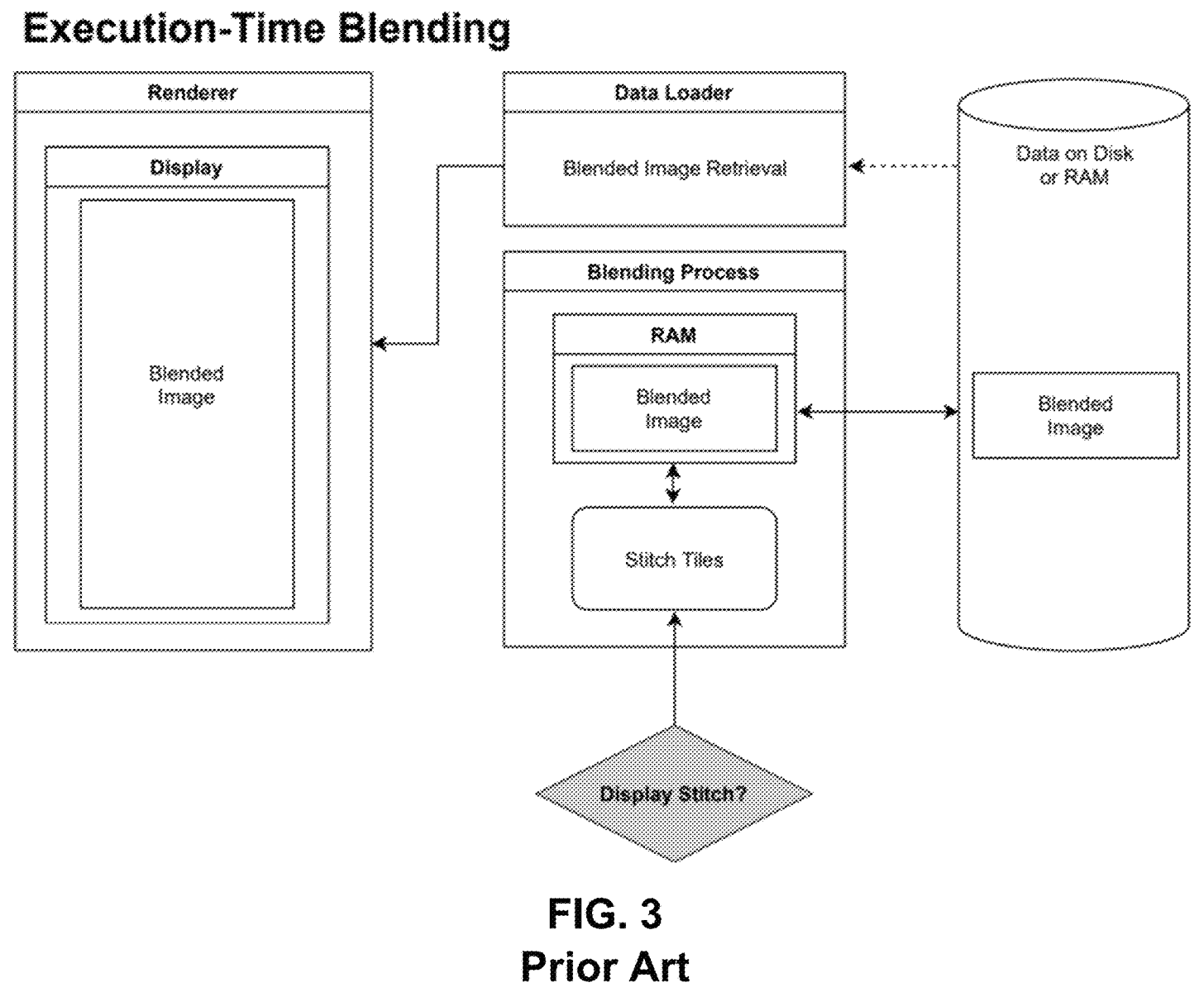

FIG. 3 shows a prior art example of an image stitching algorithm wherein the stitched image is generated and stored on the disk and must be reloaded to edit, view, or rearrange the stitched image.

DETAILED DESCRIPTION OF THE INVENTION

Following is a list of elements corresponding to a particular element referred to herein:

100 computing device
200 display component
300 graphics processing unit (GPU)
310 GPU image buffer
320 GPU alpha buffer
400 central processing unit (CPU)

As used herein, the term "alpha blending" is defined as the combination of two digital images to smoothly layer one image over the other such that a separation between the two images is imperceptible to the human eye. The approach uses an alpha mask for defining each image's contribution to the resultant stitched image. As such, applying an alpha blending mask comprises executing alpha blending only on overlapping regions between the first and second images.

Figure 1A:
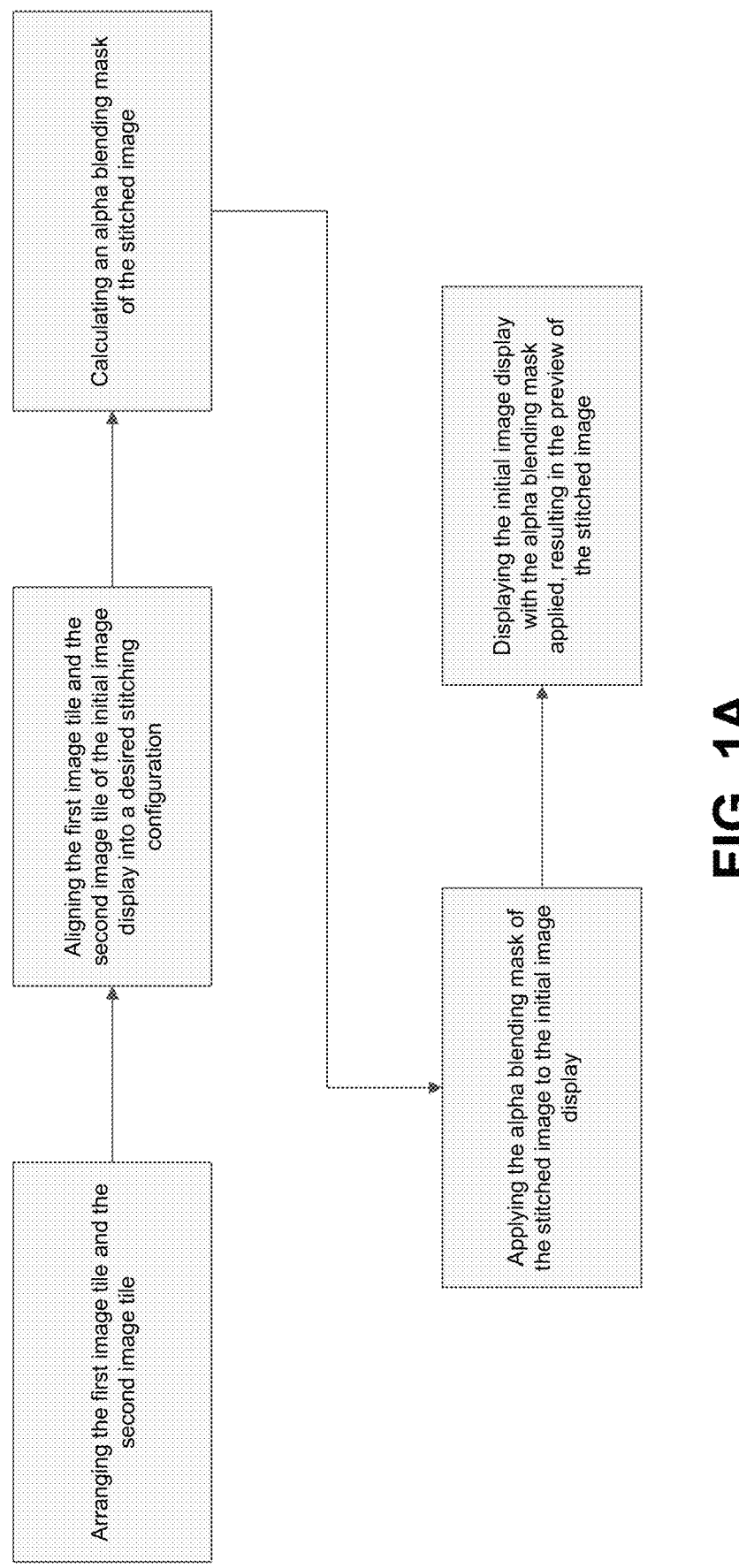
FIG. 1A shows a flow chart of a method for digital image stitching through the use of reactive alpha masking of the present invention.
Figure 2:
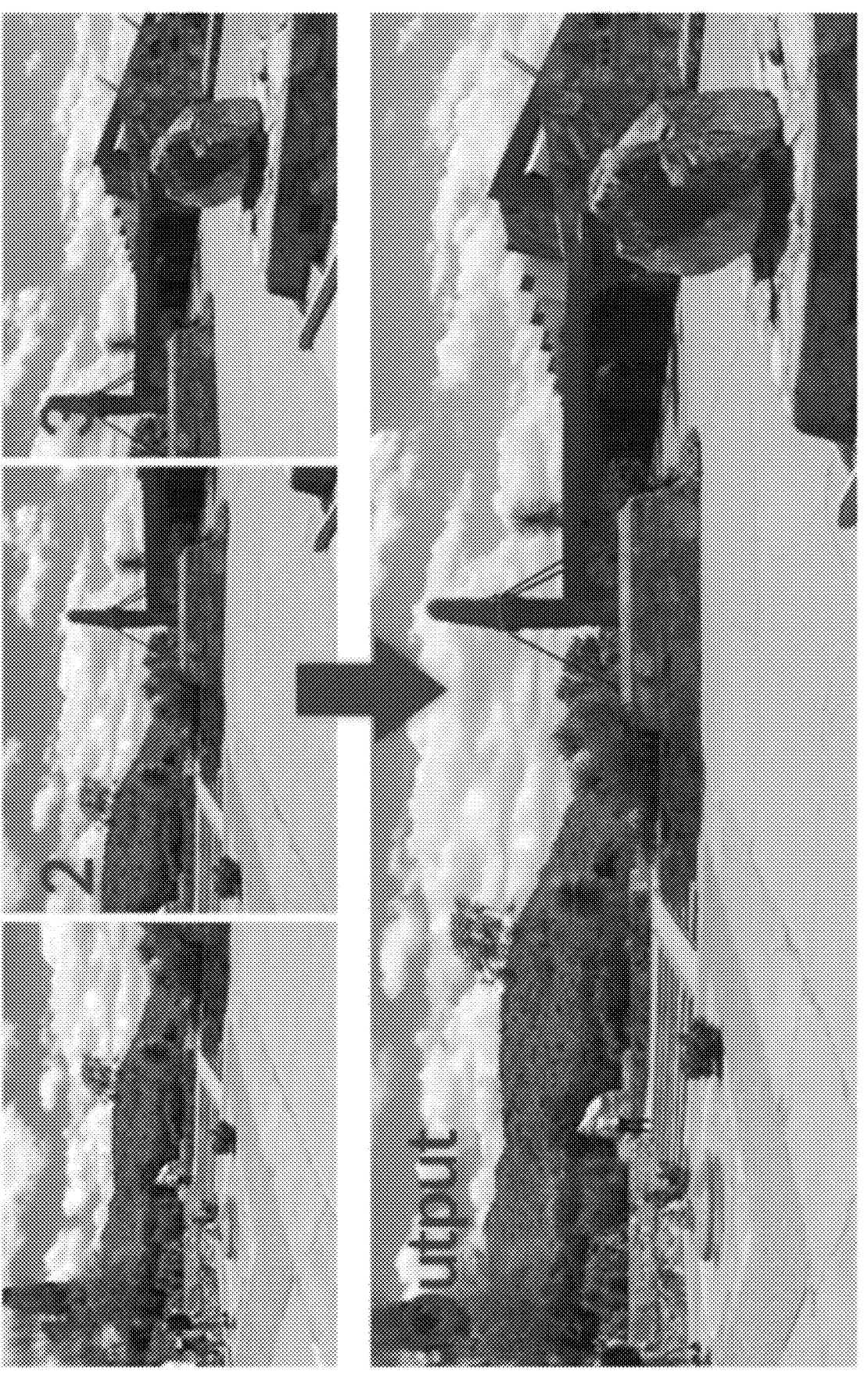
FIG. 2 shows an example of an image stitching algorithm as implemented in the present invention. Three images with overlapping pixel regions/fields of view are stitched into a single panoramic image.

The key features of the presently claimed invention may comprise the reactive computation of masks to tile position changes, the tight coupling between the renderer position information, the alpha mask generator module (400), and the GPU image cache. The first and second image tiles may comprise tens to hundreds of gigabytes of data not able to be stored in a standard cache of a computing device. Referring now to FIG. 1A, the present invention features a method for stitching a first image tile and a second image tile to display a preview of a stitched image through the use of alpha masking. The method may comprise arranging the first image tile and the second image tile into a desired stitching configuration (e.g. side by side, above and below). The first image tile may comprise one or more pixel regions that correspond to one or more pixel regions of the second image tile (e.g. overlapping pixel regions or fields of view). This desired stitching configuration may comprise an initial image display, as seen in the upper portion of FIG. 2. In some embodiments, the method may further comprise storing the initial image display in a GPU image buffer (310). The method may further comprise aligning the first image tile and the second image tile of the initial image display such that the one or more pixel regions of the first image tile overlap the corresponding one or more pixel regions of the second image tile. This may comprise rotation, translation, and/or scaling of the first image tile to align with the second image tile.

The method may further comprise stitching the aligned first image tile to the aligned second image tile through an image stitching algorithm, as described in the background section, resulting in the stitched image. The method may further comprise calculating an alpha blending mask of the stitched image. In some embodiments, the method may further comprise storing the alpha blending mask in a GPU alpha buffer (320). In some embodiments, the method may further comprise retrieving, before applying the alpha blending mask, the initial image display from the GPU image buffer (310). In some embodiments, the method may further comprise retrieving the alpha blending mask from the GPU alpha buffer (320) to be applied to the initial image display. In some embodiments, the method may only perform the previous operations on the subset of the image being displayed. The method may further comprise applying the alpha blending mask of the stitched image to the initial image display and displaying the initial image display with the alpha blending mask applied, resulting in the preview of the stitched image.

In some embodiments, the method may further comprise toggling the alpha blending mask off, such that the initial image display is displayed, and toggling the alpha blending mask on, such that the preview of the stitched image is displayed. Toggling on the alpha blending mask may comprise the aforementioned "preview capabilities." In some embodiments, displaying the initial image display with the alpha blending mask applied may comprise transmitting the initial image display with the alpha blending mask as a display component (200). The display component (200) may be selected from a group comprising a monitor, a tablet, and a mobile device. In some embodiments, this method is used for stitching 2D images. In some embodiments, this method is used for stitching 3D images through the use of a plurality of stitches of 2D slices of each 3D image. In some embodiments, the method is used in the field of microscopy for stitching and previewing images generated by a microscope.

Figure 1B:
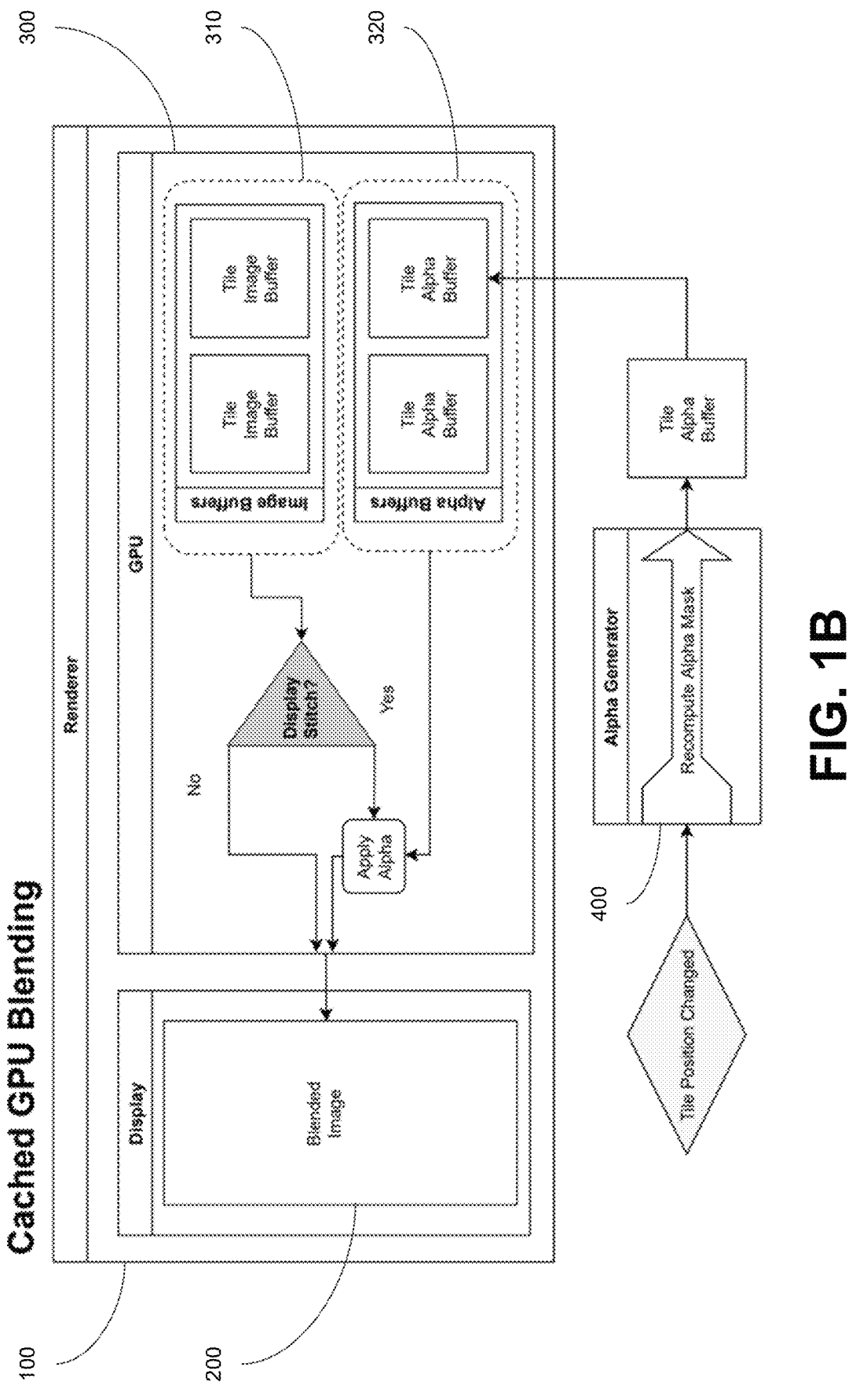
FIG. 1B shows a schematic diagram of a system for digital image stitching through the use of reactive alpha masking of the present invention.

Referring now to FIG. 1B, the present invention features a system for stitching a first image tile and a second image tile to display a preview of a stitched image through the use of alpha masking. In some embodiments, the system may comprise a computing device (100). The computing device (100) may comprise a display component (200). In some embodiments, the display component (200) may be selected from a group comprising a monitor, a tablet, and a mobile device. In some embodiments, the computing device (100) may be selected from a group comprising a smart device, a personal computing device, and a cloud computing device.

The computing device (100) may further comprise a central processing unit (CPU) (400) and a graphic processing unit (GPU) (300). The computing device (100) may further comprise a memory component comprising computer-readable instructions for the CPU (400) arranging the first image tile and the second image tile. The first image tile may comprise one or more pixel regions that correspond to one or more pixel regions of the second image tile, resulting in an initial image display. The memory component may further comprise computer-readable instructions for the CPU (400) aligning the first image tile and the second image tile of the initial image display into a desired stitching configuration such that the one or more pixel regions of the first image tile overlap the corresponding one or more pixel regions of the second image tile. Aligning the first image tile and the second image tile may comprise rotation, translation, scaling, or a combination thereof. The memory component may further comprise computer-readable instructions for the CPU (400) calculating an alpha blending mask of the aligned image tiles and transmitting the aligned image tiles and the alpha blending mask to the GPU (300). The CPU (400) may further run in parallel to other computer-executable code on the memory component.

The memory component may further comprise computer-readable instructions for the GPU (300) accepting the aligned image tiles and the alpha blending mask from the CPU (400) and stitching the aligned first image tile to the aligned second image tile through an image stitching algorithm and the alpha blending mask, resulting in the stitched image. The memory component may further comprise computer-readable instructions for displaying, by the display component (200), the initial image display with the alpha blending mask applied, resulting in the preview of the stitched image. In some embodiments, the memory component may further comprise computer-readable instructions for toggling the alpha blending mask off, such that the initial image display is displayed, and toggling the alpha blending mask on, such that the preview of the stitched image is displayed. Toggling on the alpha blending mask may comprise the aforementioned "preview capabilities." In some embodiments, the memory component may further comprise computer-readable instructions for storing the aligned image tiles and/or the alpha blending mask in a GPU alpha buffer (320), and retrieving the aligned image tiles and/or the alpha blending mask from the GPU alpha buffer (320) to be applied to the initial image display. In some embodiments, this system is used for stitching 2D images. In some embodiments, this system is used for stitching 3D images through the use of a plurality of stitches of 2D slices of each 3D image. In some embodiments, the method is used in the field of microscopy for stitching and previewing images generated by a microscope.

The present invention features a non-transitory computer-readable storage medium for stitching a first image tile and a second image tile to display a preview of a stitched image through the use of alpha masking. In some embodiments, the medium may comprise a computer-readable code, which when executed by a processing computing device, causes the processing computing device to arrange the first image tile and the second image tile. The first image tile may comprise one or more pixel regions that correspond to one or more pixel regions of the second image tile, resulting in an initial image display. The code may further cause the processing computing device to align the first image tile and the second image tile of the initial image display into a desired stitching configuration such that the one or more pixel regions of the first image tile overlap the corresponding one or more pixel regions of the second image tile. The code may further cause the processing computing device to calculate an alpha blending mask of the aligned image tiles, stitch the aligned first image tile to the aligned second image tile through an image stitching algorithm and the alpha blending mask, resulting in the stitched image, and display the initial image display with the alpha blending mask applied, resulting in the preview of the stitched image.

The code may further cause the processing computing device to store the initial image display in an image buffer (310), and retrieve, before applying the alpha blending mask, the initial image display from the image buffer (310). The code may further cause the processing computing device to store the alpha blending mask in an alpha buffer (320), and retrieve the alpha blending mask from the alpha buffer (320) to be applied to the initial image display. The code may perform the previous operations on only a subset of the image being displayed. The code may further cause the processing computing device to toggle the alpha blending mask off, such that the initial image display is displayed, and toggle the alpha blending mask on, such that the preview of the stitched image is displayed. Aligning the first image tile and the second image tile may comprise rotation, translation, scaling, or a combination thereof.

The computer system can include a desktop computer, a laptop computer, a tablet, or the like and can include digital electronic circuitry, firmware, hardware, memory, a computer storage medium, a computer program, a processor (including a programmed processor), or the like. The computing system may include a desktop computer with a screen and a tower. The tower can store digital images in binary form. The data/images can also be stored in the cloud. The images can also be divided into a matrix of pixels. The pixels can include a digital value of one or more bits, defined by the bit depth. The network or a direct connection interconnects the imaging apparatus and the computer system.

The term "processor" encompasses all kinds of apparatus, devices, and machines for processing data, including by way of example a programmable microprocessor, a computer, a system on a chip, or multiple ones, or combinations, of the foregoing. The apparatus can include special-purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The processor may include one or more processors of any type, such as central processing units (CPUs), graphics processing units (GPUs), special-purpose signal or image processors, field-programmable gate arrays (FPGAs), tensor processing units (TPUs), and so forth.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user. Examples of input devices include a keyboard, cursor control devices (e.g., a mouse or a trackball), a microphone, a scanner, and so forth, wherein the user can provide input to the computer. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. Examples of output devices include a display device (e.g., a monitor or projector), speakers, a printer, a network card, and so forth. Display devices may include display devices that provide visual information, this information typically may be logically and/or physically organized as an array of pixels. In addition, a computer can interact with a user by sending documents to and receiving documents from a device that is used by the user; for example, by sending web pages to a web browser on a user's client device in response to requests received from the web browser.

An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. In some implementations, the interface may be a touch screen that can be used to display information and receive input from a user. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related field will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method for stitching a first image tile and a second image tile to display a preview of a stitched image through use of alpha masking, the method comprising:
   a. arranging the first image tile and the second image tile, wherein the first image tile comprises a plurality of pixel regions that correspond to a plurality of pixel regions of the second image tile, resulting in an initial image;
      wherein the first image tile corresponds to a first alpha blending mask;
      wherein the second image tile corresponds to a second alpha blending mask;
   b. aligning the first image tile and the second image tile of the initial image into an initial stitching configuration such that one or more first pixel regions of the plurality of pixel regions of the first image tile overlap corresponding one or more first pixel regions of the plurality of pixel regions of the second image tile;
   c. recalculating the first alpha blending mask and the second alpha blending mask in the initial stitching configuration;
   d. realigning the first image tile and the second image tile into a desired stitching configuration different from the initial stitching configuration such that one or more second pixel regions of the plurality of pixel regions of the first image tile overlap corresponding one or more second pixel regions of the plurality of pixel regions of the second image tile;
   e. recalculating the first alpha blending mask and the second alpha blending mask in the desired stitching configuration;
   f. applying the first alpha blending mask and the second alpha blending mask of the stitched image to the initial image through an image stitching algorithm;
   g. displaying the initial image with the first alpha blending mask and the second alpha blending mask applied, resulting in the preview of the stitched image;
   h. toggling the first alpha blending mask and the second alpha blending mask off, such that the initial image is displayed; and
   i. toggling the first alpha blending mask and the second alpha blending mask on, such that the preview of the stitched image is displayed.

2. The method of claim 1 further comprising:

a. storing the initial image in a graphic processing unit (GPU) image buffer; and b. retrieving, before applying the first alpha blending mask and the second alpha blending mask, the initial image from the GPU image buffer.

3. The method of claim 1 further comprising:

a. storing the first alpha blending mask and the second alpha blending mask in a graphic processing unit (GPU) alpha buffer; and b. retrieving the first alpha blending mask and the second alpha blending mask from the GPU alpha buffer to be applied to the initial image.

4. The method of claim 1, wherein aligning the first image tile and the second image tile comprises rotation, translation, scaling, or a combination thereof.

5. The method of claim 1, wherein displaying the initial image with the first alpha blending mask and the second alpha blending mask applied comprises transmitting the initial image with the first alpha blending mask and the second alpha blending mask to the display component.

6. The method of claim 5, wherein the display component is selected from a group comprising a monitor, a tablet, and a mobile device.

7. A system for stitching a first image tile and a second image tile to display a preview of a stitched image through use of alpha masking, the system comprising:

a. a computing device comprising:

i. a display component;

ii. a central processing unit (CPU);

iii. a graphic processing unit (GPU); and iv. a memory component comprising computer-readable instructions for:

A. arranging, by the CPU, the first image tile and the second image tile, wherein the first image tile comprises a plurality of pixel regions that correspond to a plurality of pixel regions of the second image tile, resulting in an initial image display;

wherein the first image tile corresponds to a first alpha blending mask;

wherein the second image tile corresponds to a second alpha blending mask:

B. aligning, by the CPU, the first image tile and the second image tile of the initial image into an initial stitching configuration such that one or more first pixel regions of the plurality of pixel regions of the first image tile overlap corresponding one or more first pixel regions of the plurality of pixel regions of the second image tile;

C. recalculating the first alpha blending mask and the second alpha blending mask in the initial stitching configuration;

D. realigning, by the CPU, the first image tile and the second image tile into a desired stitching configuration different from the initial stitching configuration such that one or more second pixel regions of the plurality of pixel regions of the first image tile overlap corresponding one or more second pixel regions of the plurality of pixel regions of the second image tile;

E. recalculating, by the CPU, the first alpha blending mask and the second alpha blending mask of the aligned image tiles in the desired stitching configuration;

F. transmitting the aligned image tiles, the first alpha blending mask, and the second alpha blending mask to the GPU;

G. accepting, by the GPU (300), the aligned image tiles, the first alpha blending mask, and the second alpha blending mask from the CPU;

H. stitching, by the GPU, the aligned first image tile to the aligned second image tile through an image stitching algorithm, the first alpha blending mask, and the second alpha blending mask, resulting in the stitched image;

I. displaying, by the display component, the initial image with the first alpha blending mask and the second alpha blending mask applied, resulting in the preview of the stitched image;

J. toggling the first alpha blending mask and the second alpha blending mask off, such that the initial image is displayed; and K. toggling the first alpha blending mask and the second alpha blending mask on, such that the preview of the stitched image is displayed.

8. The system of claim 7, wherein the memory component further comprises computer-readable instructions for:

a. storing the initial image in a GPU image buffer; and b. retrieving, before applying the first alpha blending mask and the second alpha blending mask, the initial image from the GPU image buffer.

9. The system of claim 7, wherein the memory component further comprises instructions for:

a. storing the first alpha blending mask and the second alpha blending mask in a GPU alpha buffer; and b. retrieving the first alpha blending mask and the second alpha blending mask from the GPU alpha buffer to be applied to the initial image.

10. The system of claim 7, wherein the display component is selected from a group comprising a monitor, a tablet, and a mobile device.

11. The system of claim 7, wherein aligning the first image tile and the second image tile comprises rotation, translation, scaling, or a combination thereof.

12. The system of claim 7, wherein the computing device is selected from a group comprising a smart device, a personal computing device, and a cloud computing device.

13. A non-transitory computer-readable storage medium for stitching a first image tile and a second image tile to display a preview of a stitched image through use of alpha masking, the system comprising:

a. a computer-readable code, which when executed by a processing computing device, causes the processing computing device to:

i. arrange the first image tile and the second image tile, wherein the first image tile comprises a plurality of pixel regions that correspond to a plurality of pixel regions of the second image tile, resulting in an initial image;

wherein the first image tile corresponds to a first alpha blending mask;

wherein the second image tile corresponds to a second alpha blending mask:

ii. align the first image tile and the second image tile of the initial image into an initial stitching configuration such that one or more first pixel regions of the plurality of pixel regions of the first image tile overlap corresponding one or more pixel regions of the plurality of pixel regions of the second image tile;

iii. recalculate the first alpha blending mask and the second alpha blending mask of the aligned image tiles in the initial stitching configuration;

iv. realigning the first image tile and the second image tile into a desired stitching configuration different from the initial stitching configuration such that one or more second pixel regions of the plurality of pixel regions of the first image tile overlap corresponding one or more second pixel regions of the plurality of pixel regions of the second image tile;

v. recalculate the first alpha blending mask and the second alpha blending mask of the aligned image tiles in the desired stitching configuration;

vi. stitch the aligned first image tile to the aligned second image tile through an image stitching algorithm, the first alpha blending mask, and the second alpha blending mask, resulting in the stitched image;

vii. display the initial image with the first alpha blending mask and the second alpha blending mask applied, resulting in the preview of the stitched image;

viii. toggle the first alpha blending mask and the second alpha blending mask off, such that the initial image is displayed; and ix. toggle the first alpha blending mask and the second alpha blending mask on, such that the preview of the stitched image is displayed.

14. The non-transitory computer-readable storage medium of claim 13 further comprising computer-readable code, which when executed by a processing computing device, causes the processing computing device to:

a. store the initial image in an image buffer; and b. retrieve, before applying the first alpha blending mask and the second alpha blending mask, the initial image from the image buffer.

15. The non-transitory computer-readable storage medium of claim 13 further comprising computer-readable code, which when executed by a processing computing device, causes the processing computing device to:

a. store the first alpha blending mask and the second alpha blending mask in an alpha buffer; and b. retrieve the first alpha blending mask and the second alpha blending mask from the alpha buffer to be applied to the initial image.

16. The non-transitory computer-readable storage medium of claim 13, wherein aligning the first image tile and the second image tile comprises rotation, translation, scaling, or a combination thereof.

\* \* \* \* \*